(12) United States Patent
Chekhanovskiy et al.

(10) Patent No.: US 8,626,921 B2
(45) Date of Patent: Jan. 7, 2014

(54) DEVICE AND SERVICE MANAGEMENT BASED ON LAYER 2 THROUGH LAYER 7 DEVICE ATTRIBUTES

(75) Inventors: Mark Chekhanovskiy, San Jose, CA (US); Mark Carroll, Saratoga, CA (US); Siddhartha Dattagupta, Irvine, CA (US); John Furlan, Belmont, CA (US); Craig Hobbs, Seattle, WA (US); Edward James, San Jose, CA (US); Insung Kim, Irvine, CA (US); Chong Liang Li, Irvine, CA (US); Dan Nguyen, Huntington Beach, CA (US); Matthew Tebbs, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 440 days.

(21) Appl. No.: 13/092,049

(22) Filed: Apr. 21, 2011

(65) Prior Publication Data

US 2011/0282936 A1    Nov. 17, 2011

Related U.S. Application Data

(60) Provisional application No. 61/327,072, filed on Apr. 22, 2010.

(51) Int. Cl.
*G06F 15/173* (2006.01)
*G06F 15/16* (2006.01)

(52) U.S. Cl.
USPC ............................ 709/226; 709/228; 709/244

(58) Field of Classification Search
USPC .................................. 709/203, 220–222, 226
See application file for complete search history.

(56) References Cited

U.S. PATENT DOCUMENTS

| | | | | |
|---|---|---|---|---|
| 6,604,140 | B1* | 8/2003 | Beck et al. | 709/226 |
| 7,533,141 | B2* | 5/2009 | Nadgir et al. | 709/200 |
| 7,756,928 | B1* | 7/2010 | Meenan et al. | 709/205 |
| 7,930,214 | B2* | 4/2011 | Knauerhase et al. | 455/456.3 |
| 8,131,870 | B1* | 3/2012 | Moon | 709/238 |
| 8,239,479 | B2* | 8/2012 | Sagar et al. | 709/217 |
| 2004/0103183 | A1* | 5/2004 | Ku et al. | 709/223 |
| 2005/0276229 | A1* | 12/2005 | Torabi | 370/252 |
| 2006/0253558 | A1* | 11/2006 | Acree et al. | 709/220 |
| 2008/0253304 | A1* | 10/2008 | Torabi | 370/254 |
| 2010/0017387 | A1* | 1/2010 | Roshen | 707/5 |
| 2010/0057835 | A1* | 3/2010 | Little | 709/203 |
| 2011/0151840 | A1* | 6/2011 | Gong et al. | 455/414.1 |

\* cited by examiner

*Primary Examiner* — Patrice Winder
(74) *Attorney, Agent, or Firm* — Patterson & Sheridan, LLP

(57) ABSTRACT

A smart network may include a smart network host device as well as one or more client devices configured to connect to the smart network. Each of the client devices may implement one or more services that the client device exposes to other devices connected to the smart network. Each of the client devices includes network layer 2 and 3 attributes as well as network layer 7 application attributes. The application attributes are enumerated as named services, which each client device registers with the smart network host device. When a client device needs access to a named service, the smart network host device uses layer 2, 3, and 7 attributes associated with the client device to select a suitable server for providing the named service to the client device.

20 Claims, 11 Drawing Sheets

DEVICE AND SERVICE MANAGEMENT BASED ON LAYER 2 THROUGH LAYER 7 DEVICE ATTRIBUTES

CROSS-REFERENCE TO RELATED APPLICATIONS

This application claims benefit of U.S. provisional patent application Ser. No. 61/327,072, filed Apr. 22, 2010, which is herein incorporated by reference in its entirety.

BACKGROUND

1. Technical Field

The present disclosure relates generally to automated network configuration systems and, more specifically, to device and service management based on layer 2 through layer 7 device attributes.

2. Description of the Related Art

Home networks, in which multiple computing and/or peripheral devices are communicatively linked together in a consumer's home, are becoming increasingly ubiquitous. A home environment may include one or more computers, a wireless router, a cable modem or digital subscriber line (DSL) modem, and one or more other devices capable of connecting to the home network. Conventionally, each device in the home network must be manually configured to connect to the network and, once connected, may then communicate with other devices attached to the home network. Each connected device may offer different services to the other devices within the network or require certain services from other devices within the network. Conventionally, each device and related service must be manually configured to operate properly with other devices offering or using a certain service.

Manual configuration can technically enable devices to operate together in a given network. In practical settings, however, procedures for establishing and provisioning services within a home network are typically too involved for the majority of home network users to implement reliably. For example, a network user may need to manually reconfigure a home network router, determine a network IP address and/or hostname for each device, establish network credentials, register a networked video monitor device and a home surveillance camera, pair the monitor device with the camera, and so forth. Furthermore, in order for a device to locate another device on the home network, a device must establish communication using a unique IP address of the other device. Such connections are typically defined as peer-to-peer connections. In peer-to-peer applications, a user may be required to manually keep track of which address is associated with which device or service in order to configure the devices to communicate properly. Such manual configuration procedures present a significant challenge for unsophisticated users attempting to set up a home network and provision services on the home network.

Accordingly, there is a need in the art for systems and methods that reliably and conveniently enable the user of a home network to automatically configure and provision services provided by one or more client devices on the home network.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

In the following description, numerous specific details are set forth to provide a more thorough understanding of various example embodiments of the invention. However, it will be apparent to one of skill in the art that certain embodiments of the invention may be practiced without one or more of these specific details. In other instances, well-known features have not been described in order to avoid obscuring the invention.

Overview

One example embodiment of the preset invention sets forth a method comprising processing a registration request from a client device to be registered with a central authority associated with a wireless home network, wherein the client device is assigned a device name, is identified by a transport address and an internet protocol (IP) address, and implements one or more services, each service being assigned a service name; storing within a database a client device record corresponding to the client device that includes the client device name, the transport address, the IP address, and the service name assigned to each of the one or more services implemented by the client device; receiving a service query from the client device requesting an identity of a server machine for a first service required by the client device; determining that a first server machine included in a set of possible server machines best matches the service query based on the transport address and the IP address of the client device and at least an IP address associated with the first server machine as well as services previously associated with the first sever machine within the database; transmitting a response message to the client device identifying the first server machine.

Another example embodiment of the present invention sets forth computer-readable medium including instruction that, when executed by a processing unit, cause the processing unit to perform the steps set forth in the above method.

Yet another example embodiment of the present invention sets forth a system comprising a wireless network interface configured to communicate with one or more devices within a wireless home network; a wired network interface configured to communicate with a wide-area network interface; an identification device reader configured to read identification credentials associated with the one or more devices; a processor complex configured to perform the method steps set forth in the above method.

DETAILED DESCRIPTION OF THE FIGURES

Figure 1A:
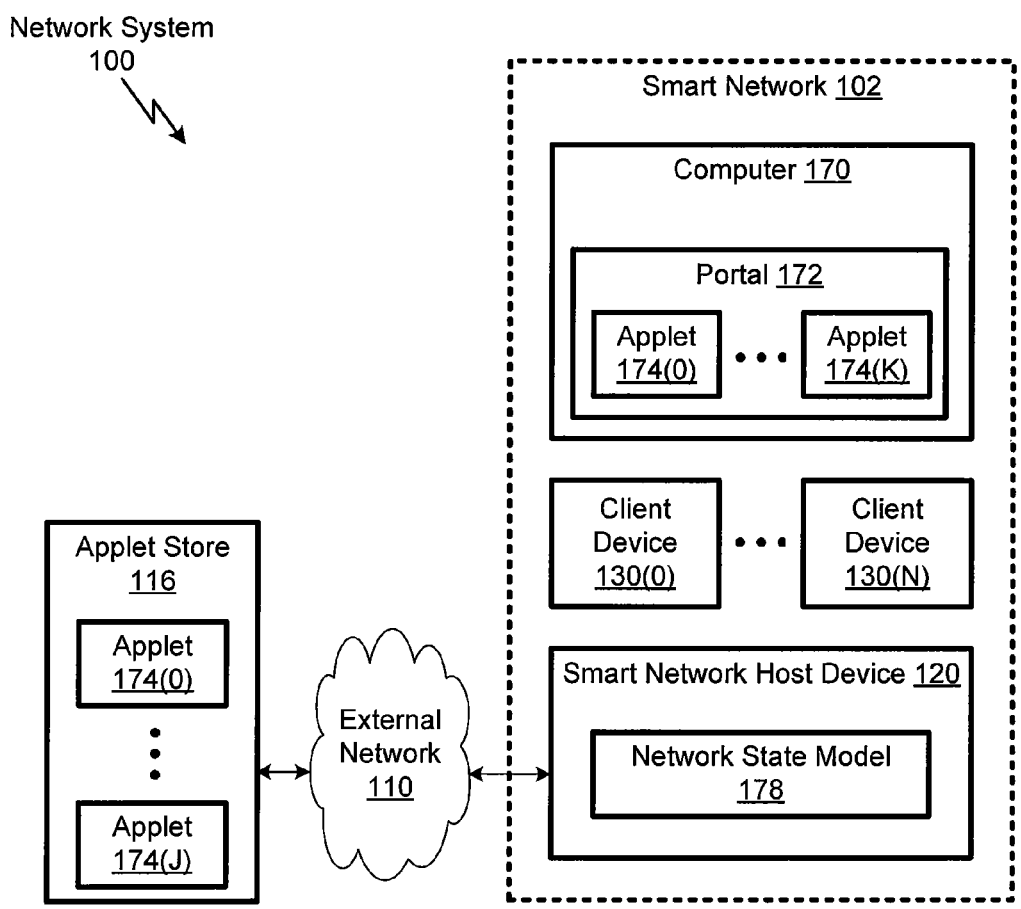
FIG. 1A is an exemplary illustration of an overarching network system configured to implement one or more aspects of the present invention.

FIG. 1A is an exemplary illustration of an overarching network system 100 configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
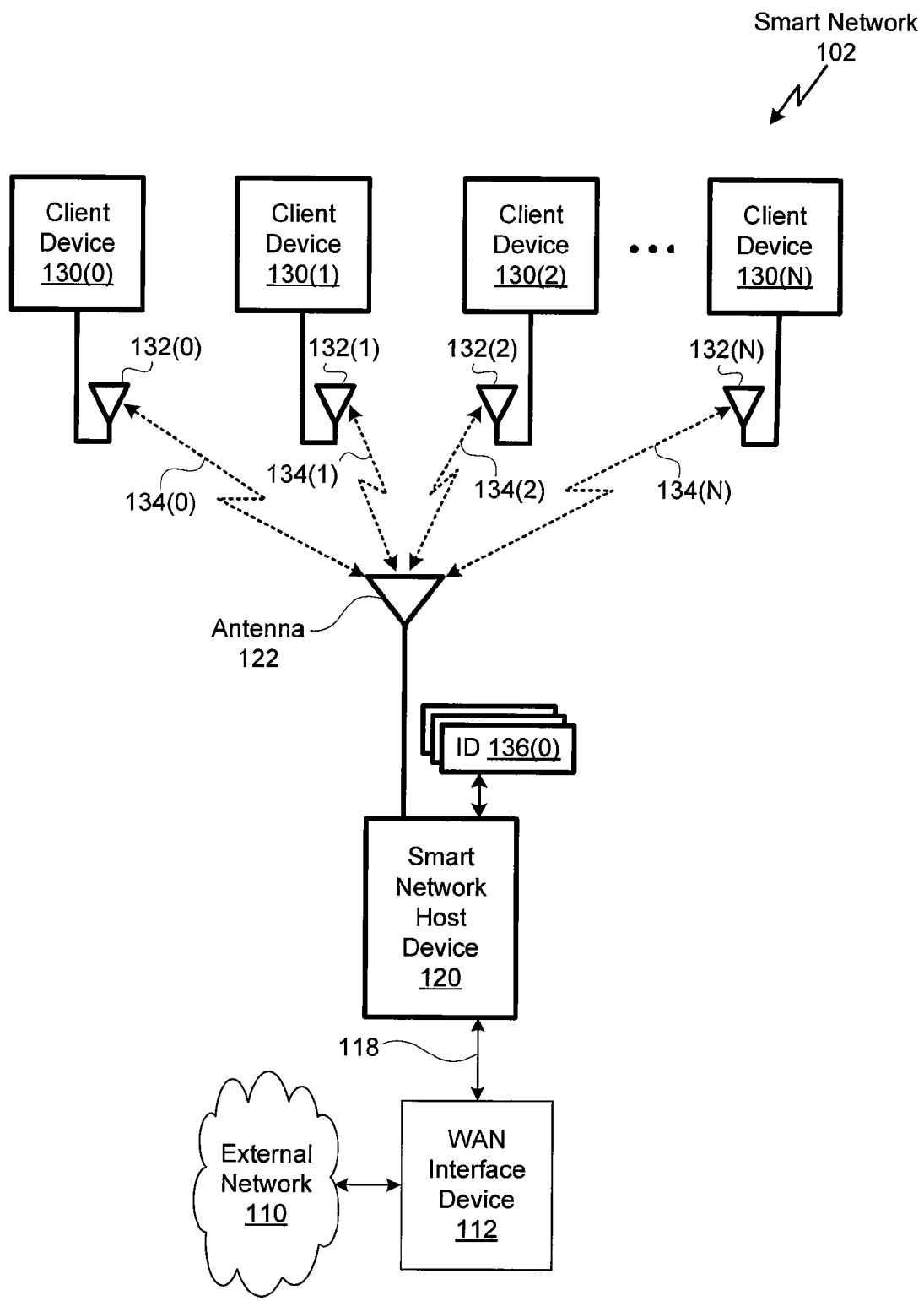
FIG. 1B illustrates the smart home network of FIG. 1A, according to one example embodiment of the present invention.

FIG. 1B illustrates the smart home network 102 of FIG. 1A, according to one example embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present invention. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
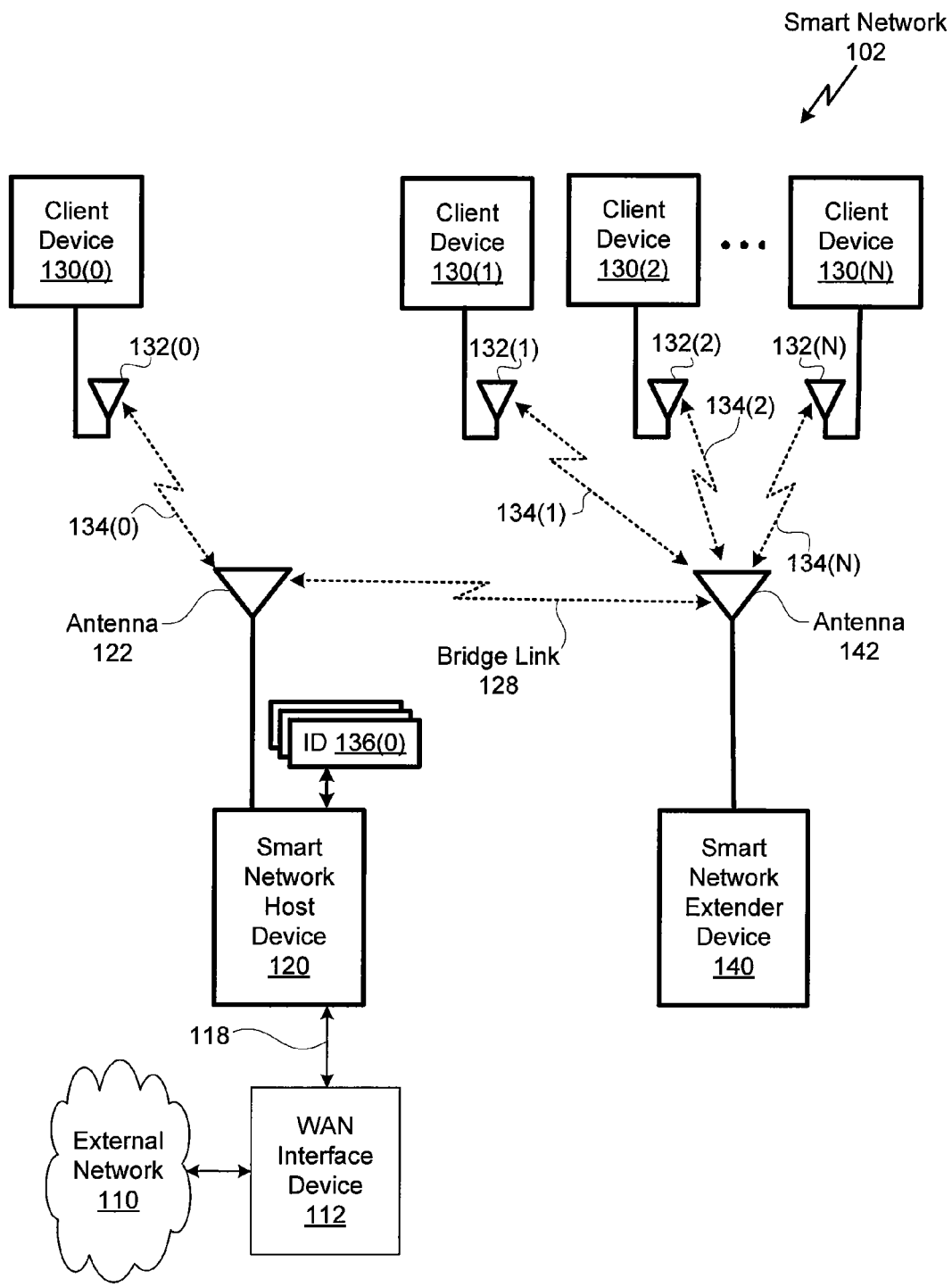
FIG. 1C illustrates the smart home network of FIG. 1A, according to another example embodiment of the present invention.

FIG. 1C illustrates the smart home network 102 of FIG. 1A, according to another example embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
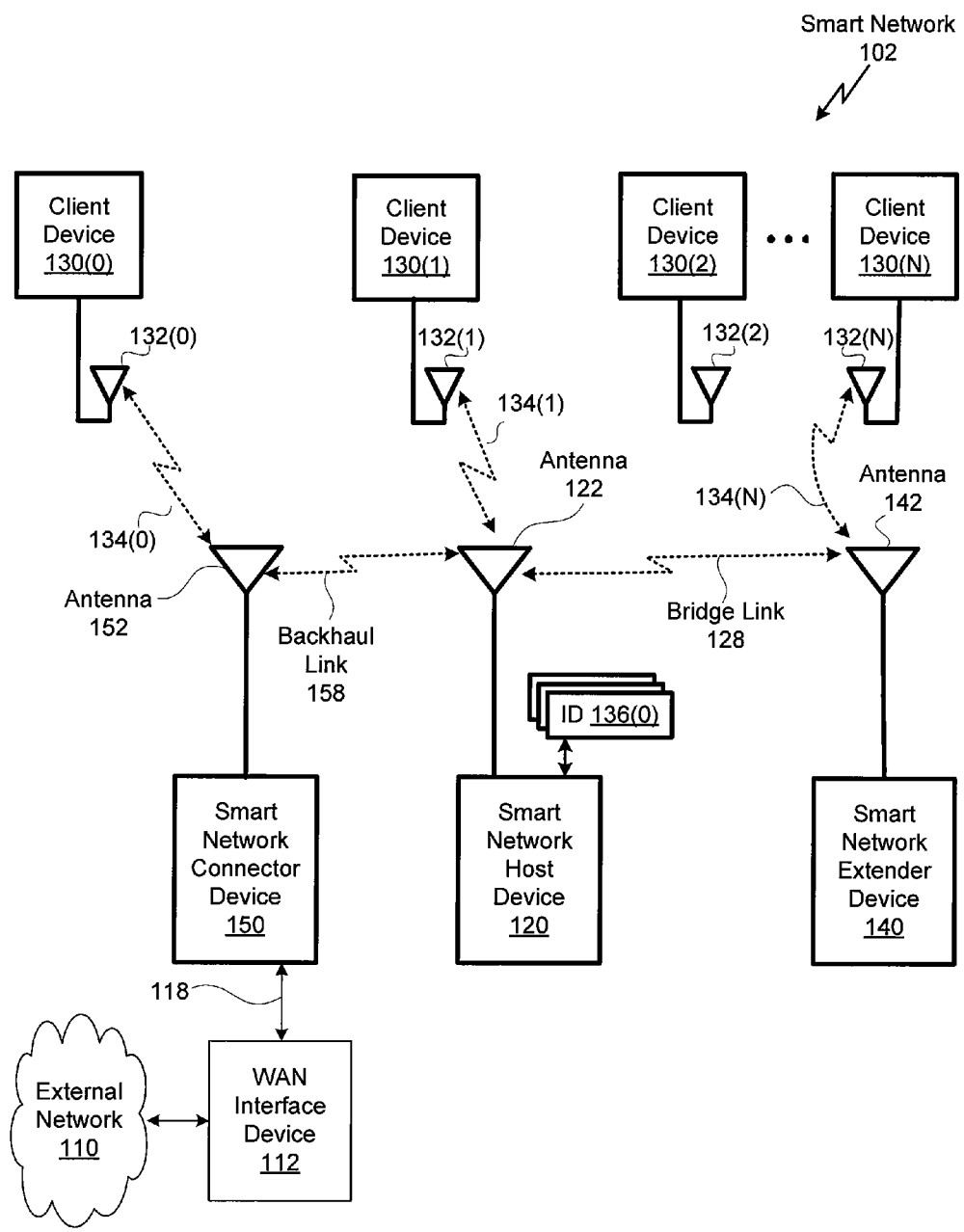
FIG. 1D illustrates the smart home network of FIG. 1A, according to yet another example embodiment of the present invention.

FIG. 1D illustrates the smart home network 102 of FIG. 1A, according to yet another example embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
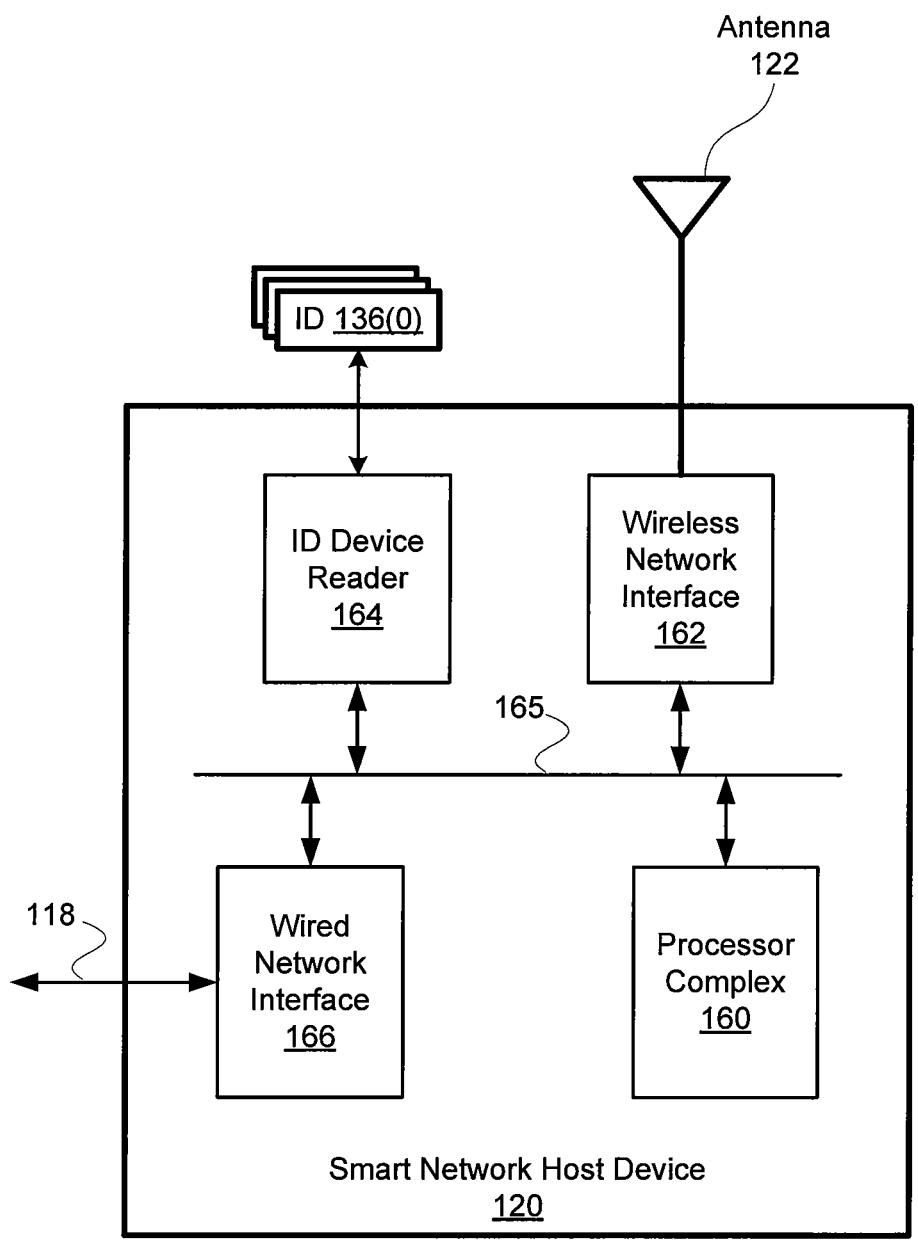
FIG. 1E is a more detailed illustration of the smart network host device of FIG. 1A, according to one example embodiment of the present invention.

FIG. 1E is a more detailed illustration of the smart network host device 120 of FIG. 1A, according to one example embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
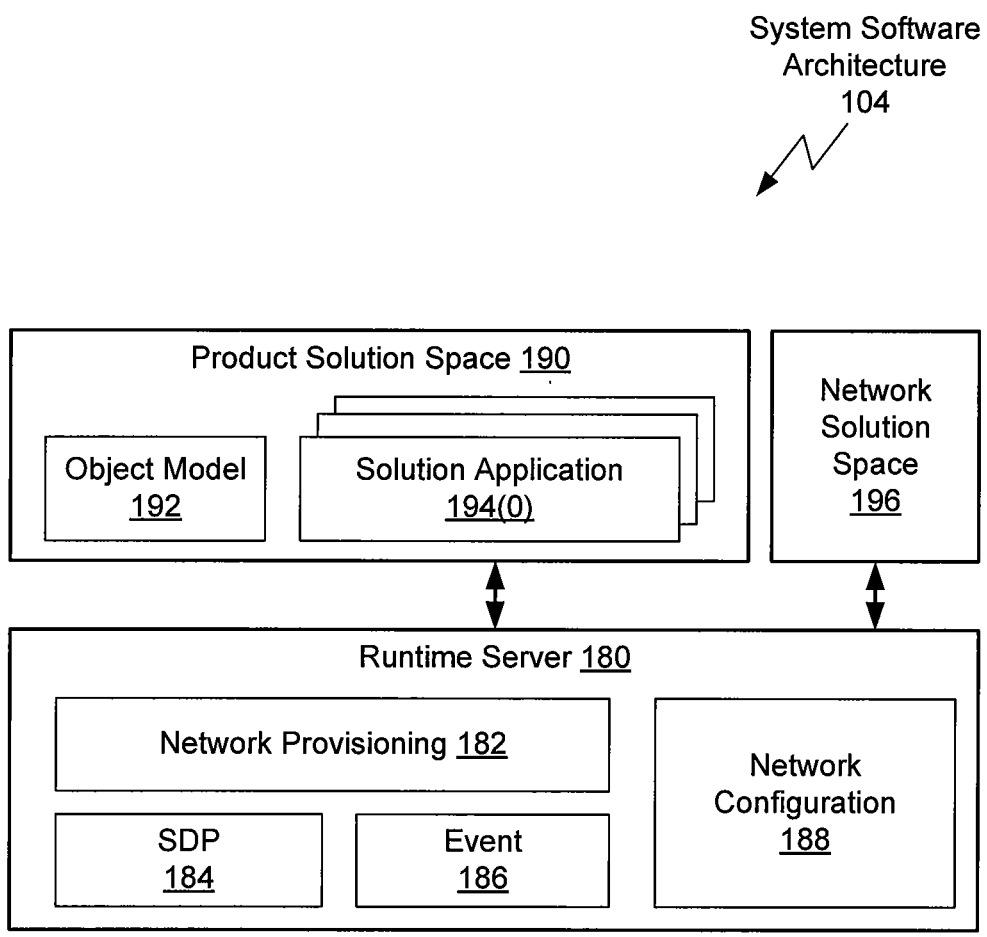
FIG. 1F illustrates a system software architecture for the smart network host device of FIG. 1E, according to one example embodiment of the present invention.

FIG. 1F illustrates a system software architecture for the smart network host device of FIG. 1E, according to one example embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

According to example embodiments of the invention, a user of the network system 100 can access one or more devices or services associated with the smart network 102 from a second smart network included in the network system 100. One or more portable identification devices associated with the smart network 102 can be carried with a user of the smart network 102 to the second smart network and used to automatically identify the smart network 102 and allow authorized access to the smart network 102 via the second smart network. The one or more portable identification devices are configured to automatically provision the second smart network with the information necessary for the second smart network to identify the smart network 102 and the authorization credentials to connect to the smart network 102. In some example embodiments, the portable identification devices comprise one or more of ID devices 136(1)-136(N) described above in conjunction with FIG. 1B.

Figure 2:
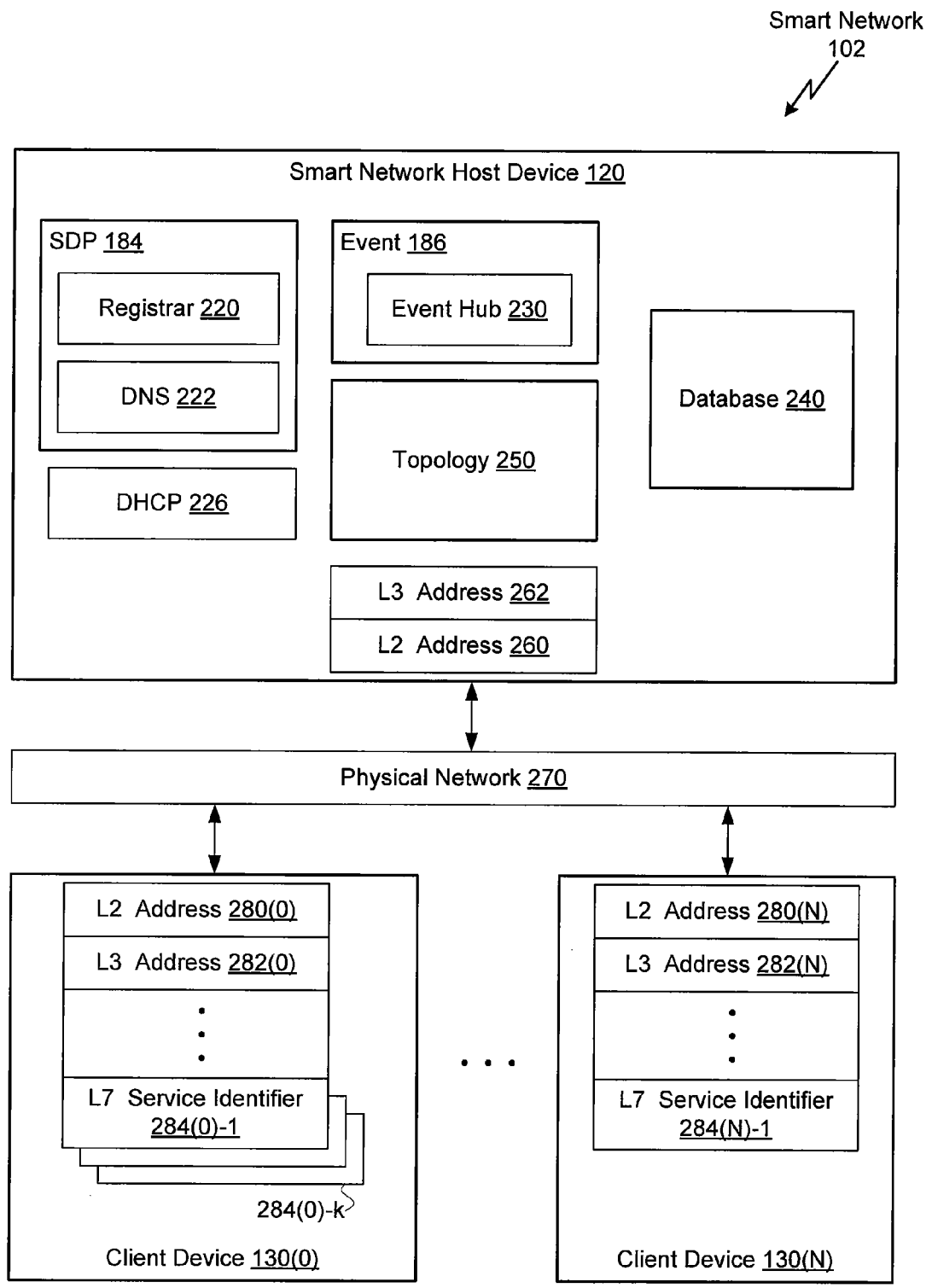
FIG. 2 illustrates devices within the smart network including associated layer 2, layer 3, and layer 7 attributes, according to one example embodiment of the present invention.

FIG. 2 illustrates devices within the smart network 102 including associated layer 2, layer 3, and layer 7 attributes, according to one example embodiment of the present invention. Each client device 130 includes a globally unique layer two (L2) address 280. Each client device 130 is assigned a layer three (L3) address 282 that is uniquely associated with a corresponding L2 (transport) address within the smart network 102. A client device 130 may include one or more application services, each assigned one or more layer seven (L7) service unique identifiers 284. Each client device may therefore be characterized as having L2, L3, and any number of L7 attributes.

The smart network host device 120 also includes a globally unique L2 address 260 and a corresponding L3 address 262 that is unique within the smart network 102. In one embodiment, L2 addresses 260, 280 comprise Ethernet media access control (MAC) addresses and L3 addresses 262, 282 comprise internet protocol (IP) addresses. The client devices 130 and the smart network host device 120 are configured to communicate via physical network 270, which may comprise any number of wireless client links 134, bridge links 128, and back haul links 158 assembled in any technically feasible topology.

Each client device 130 is configured to register with the smart network host device 120, obtain an L3 address, and state any device-specific attributes such as L7 service offerings or requirements. In one embodiment the service offerings and requirements are represented as service unique identifiers 284.

A service associated with a service unique identifier 284 implements inter-process communications for registering the service with the smart network host device 120 and availing the service to other devices within the smart network 102. Any technically feasible inter-process communications mechanism may be implemented without departing the scope or spirit of the present invention. In one embodiment, the inter-process communications are implemented by transmitting XML messages to other devices within the smart network 102 via physical network 270. Such an XML-based service may be defined as a set of zero or more simple object access protocol (SOAP) actions and zero or more service events and may be implemented as a set of software instructions that are executed on one or more processors included in the host device. For example, the smart network host device 120 may implement the service as a set of instructions configured to be executed by the processor complex 160. The service may be accessible through an IP port number associated with a particular device. Each port may be associated with a single instance of the service, and multiple instances of the service may be accessible through different ports of the device. Each service may include a version number that identifies the particular set of operations defined by the service.

The smart network host device 120 includes an SDP module 184, an event module 186, a DHCP module 226, a topology module 250, and a database module 240. Each module 184, 186, 226, 250 is configured to reside within a memory system associated with the processor complex 160 of FIG. 1E. As described above in connection with FIG. 1F, the SDP module 184 maintains a persistent view of different network devices and related services, based on data from the event module 186 and on data from the different client devices 130. In one embodiment, the SDP module 184 includes a registrar server 220 and a domain name system (DNS) server 222. The registrar server 220 implements an application programming interface (API) that enables a client device 130 to register with the smart network host device 120 and discover other client devices 130 and services having service unique identifiers 284 available within the smart network 102. In addition to a service unique identifier 284, a service may also have a type, version, "friendly" name, status, and a control URL for managing the service. The DNS server 222 implements an API for adding, updating, or deleting entries in a database 240. The DNS server 222 may be a standard domain name system server. In alternative embodiments, the DNS server 222 may be replaced by a different type of server that implements a custom set of functions to add, update, or delete entries in the database 240. In such alternative embodiments, each entry in the database 240 may be a data structure or a pointer to a data structure that stores information about a client device 130.

The event module 186 includes an event hub server 230 that implements an API for exposing service events to one or more client devices 130 or services having service unique identifiers 284. The event hub server 230 manages one or more lists of client devices 130 and services having service unique identifiers 284 that subscribe (i.e., register) to be notified when certain types of events are generated that change state of the smart network 102. Each event may be identified by a uniform resource identifier (URI) and a corresponding schema for the event payload (i.e., data including information related to the event). Calls made to the event hub server 230 may include the URI associated with the event and the domain name associated with the source of the event. Once a client device 130 or service having service unique identifier 284 has registered with the event hub server 230, the client device 130 or service may receive messages when an appropriate event occurs related to the client device 130 or service. The event hub server 230 maintains state and event subscriptions for each device within the smart network 102. The event hub server 230 facilitates one-to-many communication within the smart network 102 via the event subscriptions.

For example, a first client device 130(0) may implement a service for viewing media such as recorded television programs. When the first client device 130(0) connects to the smart network 102, the first client device 130(0) makes a call to the registrar server 220 to register the client device 130(0) and a media content service with the smart network host device 120. The media content service executing within the first client device 130(0) may make a call to the event hub server 230 in order to register to be notified whenever an event type matching a specific type of event (e.g., a program recording finished type event) is received by the event hub server 230. A second client device 130(1) may implement a media content service for recording media on a large storage disk. When the second client device 130(1) finishes recording a particular program, the media content service associated with the second client device 130(1) may be configured to generate a program recording finished event and notify the event hub server 230 of the event. The event hub server 230 determines that the first client device 130(0) has subscribed to be notified whenever this type of event has been generated and, therefore, sends a message to the media content service executing on the first client device 130(0) informing the service that a program has finished recording. In response to receiving the message about the event, the first client device 130(0) may perform certain tasks based on information associated with the event. For instance, in the above example, the first client device 130(0) may update a user interface, such as a menu on a television screen, to include a listing of the recorded program in a list of available recordings.

The DHCP module 226 provides IP leases to client devices 130. Each lease is noted within the database 240 as an L3 address attribute associated with a respective client device 130. The topology module 250 maintains topology information indicating the structure of the physical network 270 and how each client device 130 connects to the physical network 270. Topology information may be stored within the database 240. For example, client device 130(0) may be connected directly to the smart network host device 120, while client device 130(1) may be connected via smart network extender device 140. The topology module 250 may determine this structure and the structure within the database 240.

Figure 3:
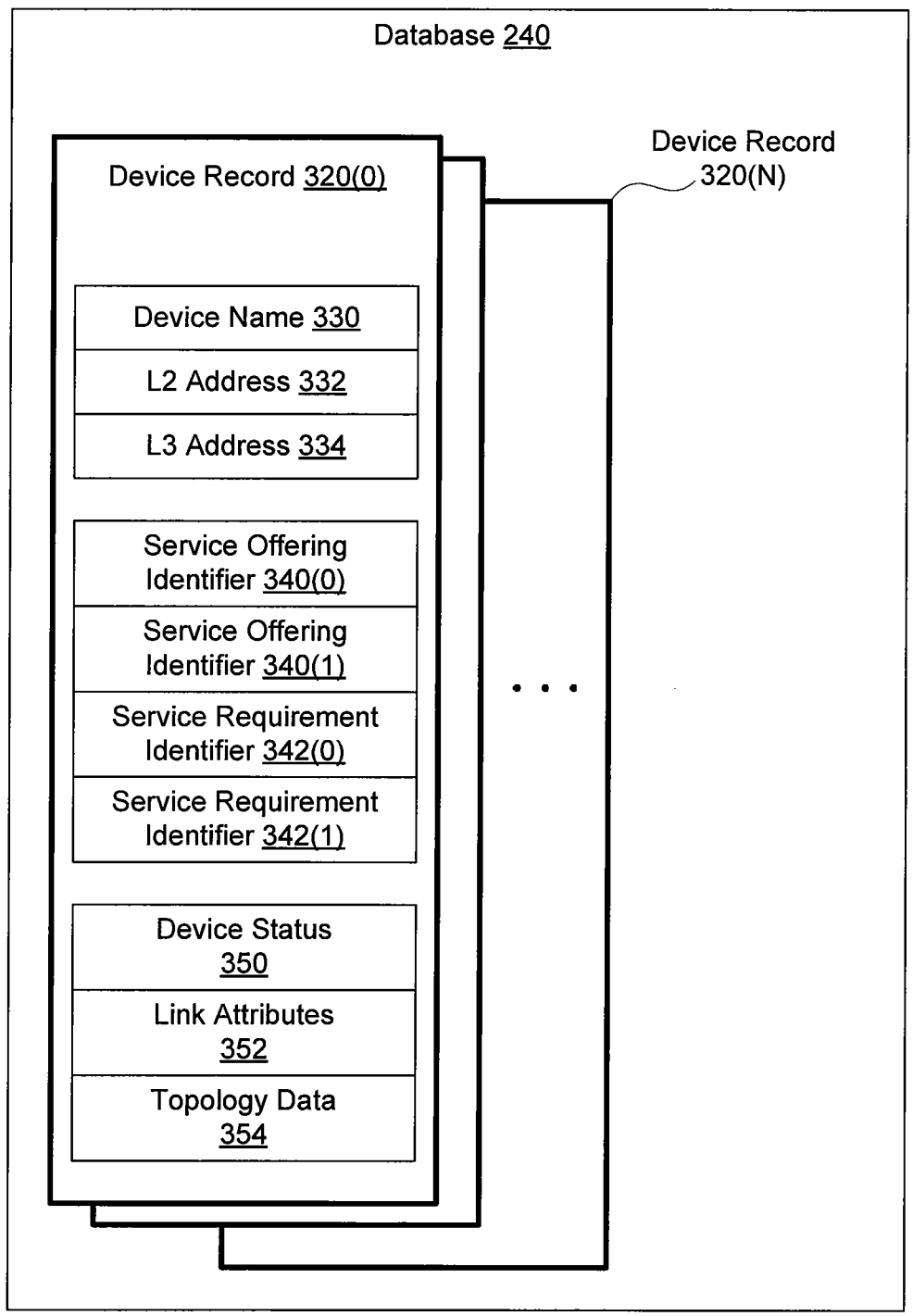
FIG. 3 illustrates a database for provisioning client devices and services on the smart network, according to one example embodiment of the present invention.

FIG. 3 illustrates a database 240 for provisioning client devices 130 and services on the smart network 102, according to one example embodiment of the present invention. The database 240 includes one or more device records 320, each comprising a device name 330, an L2 address 332, an L3 address, device status 350, and link attributes 352. Each device record 320 may also include an arbitrary number of service offering identifiers 340, and an arbitrary number of service requirement identifiers 342. Furthermore, each device record 320 may include topology data 354. Alternatively, the topology data 354 may be stored as a separate or related data structure. The topology data 354 may represent connectivity associated with the smart network 102 using any technically feasible technique, including connectivity graphs, forwarding tables, and the like. The topology data 354 may associate different parameters with each edge and node for a given configuration. For example, a graph edge (network link) may include a maximum link bandwidth and current utilization level for the edge. Device status 350 indicates relevant operating information about a client device 130, such as whether the client device 130 is turned on and operating normally. Link attributes 352 may include link speed and error rates.

Each service offering identifier 340 identifies a specific type of services offered by the client device that is uniquely identified within the smart network 102 by device name 330, and associated L2 address 332 and L3 address 334. A service requirement identifier 342 identifies a specific type of services required by the client device. The database 240 may be configured to operate in conjunction with DNS server 222, configured to process name space queries. For example, DNS server 222 may reply to a query to bind an IP address to a device name from a device namespace. The DNS server 222 may also reply to a query to bind an IP address to a service name from a service namespace. The database 240 represents a repository of current state for the smart network 102, including named devices and named services within the smart network 102. The IP address may be an IPv4 address, an IPv6 address, or any other technically feasible L3 address. A named service may be provided by a client device 130, or a device outside the smart network 102, and connected to the smart network 102 via the external network 110.

In one embodiment, each client device 130 implements a TCP/IP network stack that includes a DNS client. The DNS client may query the DNS server 222 to discover an IP address and port for the registrar server 220 running on the smart network host device 120. Once the DNS server 222 has returned an IP address and port for the registrar server 220, the client device 130 may make a call to the registrar server 220 to register the device and any services the client device 130 makes available on the smart network 102. In alternative embodiments, each client device 130 may discover the IP address and port for the registrar server 220 via a vendor-defined DHCP option. In such alternative embodiments, the network provisioning module 182 of the smart network host device 120 may implement a DHCP server. When a client device 130 connects to the smart network 102, the client device 130 may call the DHCP server to acquire an IP address. During a final stage of IP address acquisition via the DHCP server, a client device 130 may be exposed to the location of the registrar server 220 via a DHCPACK message sent from the DHCP server to the DHCP client on the client device 130. The DHCPACK message may include the URL (i.e., domain name) for the registrar server 220 that may then be resolved using the DNS server 222 to retrieve the corresponding IP address and port for the registrar server 220 on the smart network host device 120.

Device status 350 indicates relevant operating information about a client device 130, such as whether the client device 130 is turned on and operating normally. Link attributes 352 may include link speed and error rates.

Figure 4:
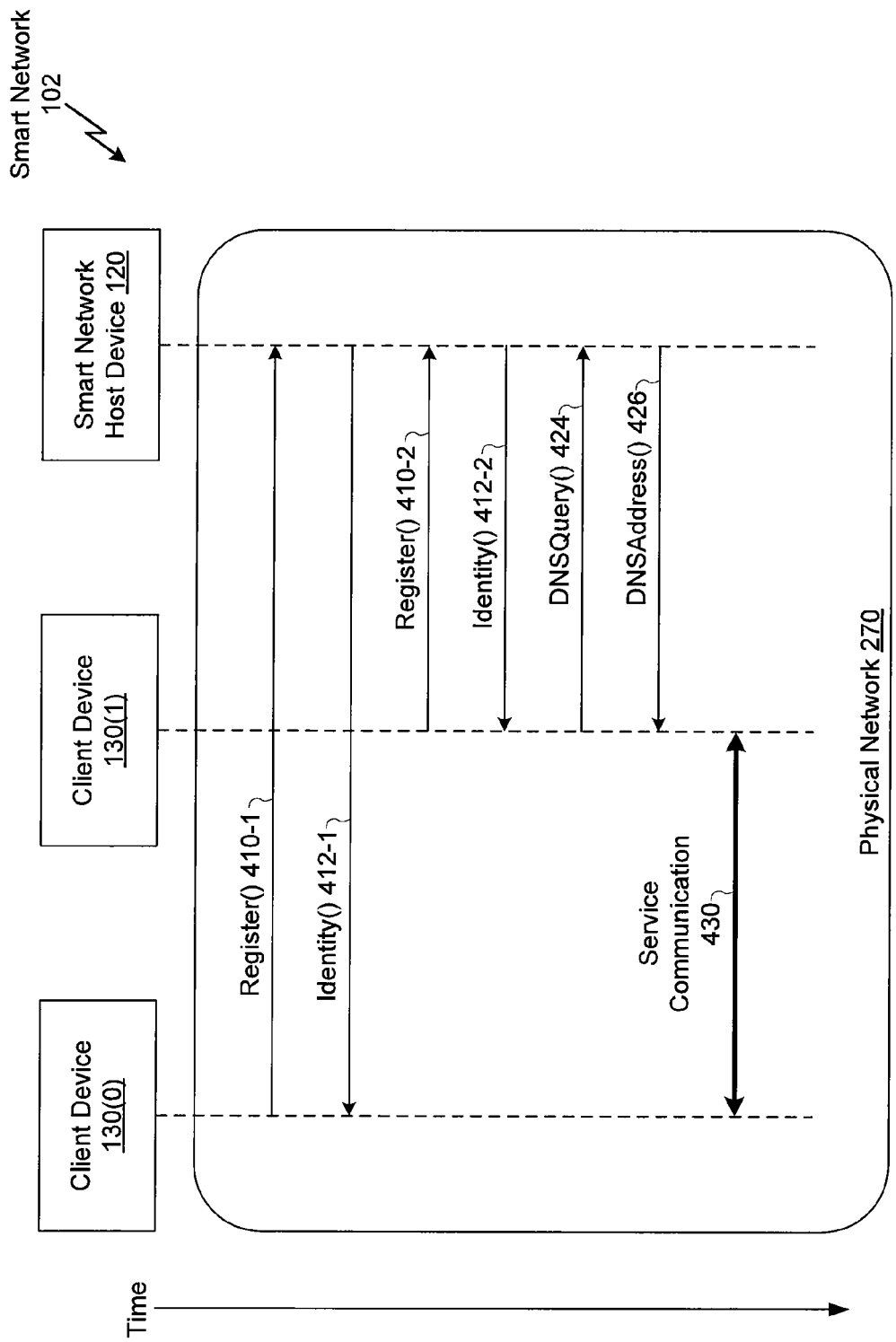
FIG. 4 is a conceptual diagram that illustrates a client device discovering and interacting with services on the smart network, according to one example embodiment of the present invention.

FIG. 4 is a conceptual diagram that illustrates a client device discovering and interacting with services on the smart network 102, according to one example embodiment of the present invention. As shown, a first client device 130(0), second client device 130(1), and smart network host device 120 are connected via physical network 270, within the smart network 102. The smart network host device 120 operates as an always-on central authority for maintaining current state of devices within the smart network 102.

A given client device 130 may be added to the smart network 102 using any technically feasible technique without departing the scope and spirit of the present invention. In one exemplary embodiment, a first client device 130(0) is added to the smart network 102 by placing an ID device 136 that is bound to the client device 130(0) in proximity of the ID device reader 164. The client device 130(0) is configured to negotiate network credentials with the smart network host device 120 and connect to the smart network host device 120 via a secure socket connection. Once the first client device 130(0) is connected to the smart network 102, an IP address may be assigned to the first client device 130(0) by calling a DHCP server on the smart network host device. The DHCP server may assign an unallocated IP address allocated to the smart network 102 to the first client device. Similarly, the second client device 130(1) is added to the smart network 102. In the smart network 102, the smart network host device 120 may be configured to use a default static IP address stored in a configuration file written to a non-volatile memory during manufacture (which may be changed during initial setup of the smart network host device 102). In contrast, the DHCP server 226 may assign client devices 130 a dynamic IP address that may change each time the client devices 130 connect to the smart network 102.

Once the first client device 130(0) has obtained an IP address, the first client device 130(0) may make a call to the registrar server 220 to register the device and one or more service unique identifiers 284 corresponding to services hosted by the client device 130(0). The first client device 130(0) may retrieve a well-known domain name for the registrar server 220 via a DHCP vendor-defined DHCP option. The first client device 130(0) transmits a Register( )message 410-1 to the registrar server 220. In one embodiment, the Register( )message 410-1 may be an XML message that includes three arguments passed as inputs. The arguments may be data structures formatted as XML messages. A first argument may include information that specifies information related to a client device 130, such as the name of the manufacturer, a description of the device, a model number, a serial number, a device type, a device ID, a device status, and a friendly name, among other like information. The second argument may include information that specifies the services that the client device 130 may expose to the smart network 102, such as an enumeration of services that include information about a service type, a service ID, a friendly name, a service status, a description of the service, and a control URL, among other like information. The third argument may include information that specifies the type of devices or services that the client device 130 would like to consume, such as a list of device types or service types that may be compatible with certain protocols implemented by the client device 130, among other like information.

In response to receiving a Register( )message 410-1 from the first client device 130(0), the registrar server 220 may assign a unique domain name to the first client device 130(0) to identify the first client device 130(0) on the smart network. Similarly, the registrar server 220 may assign a unique domain name to each service unique identifier 284 exposed to the smart network by the first client device 130(0). In one embodiment, each service unique identifier 284 exposed by the first client device 130(0) is assigned a domain name of the form_serviceID.firstDevice.home.network. Registration of the second client device 130(1) is performed in a similar fashion to that described above for registration of the first client device 130(0).

Once the registrar server 220 has assigned unique domain names to a client device 130 and related service unique identifiers 284, the registrar server 220 then transmits an Identify( )message 412, 422 to the client device 130. Each of the first client device 130(0) and the second client device 130(1) is similarly registered and identified with the smart network 102. The Identify( )message 412 is also an XML message that includes information that specifies other devices and services available on the smart network 102 as well as the unique domain names and IDs assigned to the client device 130 and the services exposed by the client device 130. In one embodiment, the registrar service 220 sends a complete list of all devices and services on the smart network 102 to the client device 130.

In one scenario, the second client device 130(1) needs to connect to a specific, named service. In one embodiment, the second client device 130(1) sends a DNSQuery( )message 424 to the smart network host device 120 for a binding to an IP address that provides the service. The smart network host device 120 replies with a DNSAddress( )message 426, indicating an IP address and port number that provides the required service. In this scenario, the first client device 130(0) is configured to provide the required service and the smart network host device 120 directs the second client device 130(1) to the first client device 130(0) for access to the required service. The second client device 130(1) then initiates service communication 430 with the first client device 130(0). The service communication 430 may be structured as a peer-to-peer communication, or communication via the smart network host device 120, which may be configured to translate data formats associated with the service communication 430.

The determination of which client device 130 (or an external device) is best suitable to provide a given, named service may be based on any technically feasible factors, including an exact service name match, bandwidth considerations, current server load, and topology considerations. Any technically feasible cost function or heuristic may be applied to determining a suitable server without departing the scope and spirit of the present invention.

Figure 5:
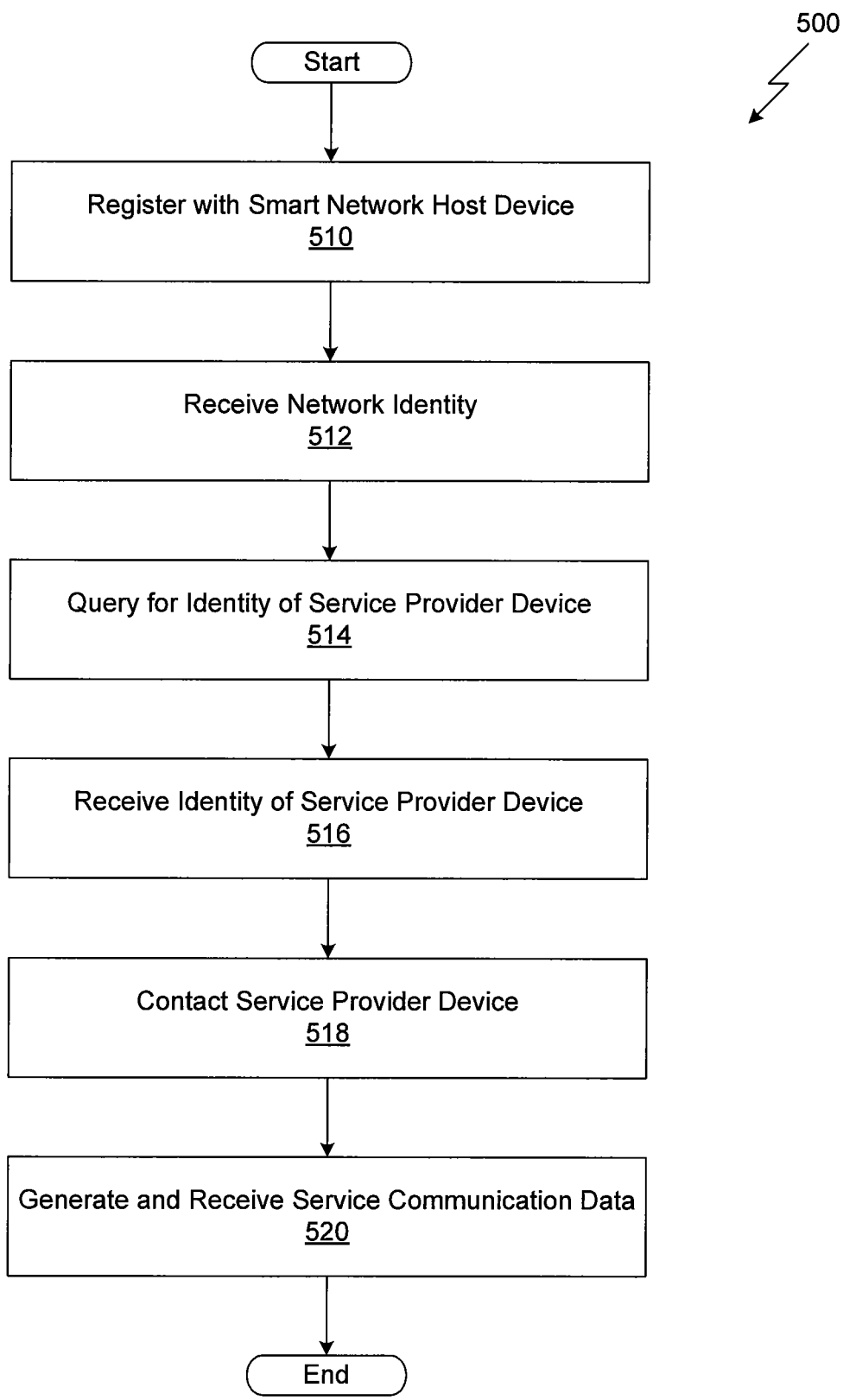
FIG. 5 is a flowchart of method steps for discovering and interacting with a service within the smart network, according to one example embodiment of the present invention.

FIG. 5 is a flowchart of method steps 500 for discovering and interacting with a service within the smart network 102, according to one example embodiment of the present invention. Although the method steps are described in conjunction with the systems of FIGS. 1A-1F, and 2-4, persons skilled in the art will understand that any other system configured to perform the method steps is within the scope of the present invention.

The method begins in step 510, where a client device 130 requests registration with the smart network host device 120. In step 512, the client device 130 receives a network identity. In step 514, the client device 130 queries the smart network host device 120 for an identity of a service provider device configured to provide a required service. In step 516, the client device 130 receives an identity of an appropriate service provider device. In step 518, the client device 130 contacts the service provider device. The service provider device may be another client device 130, the smart network host device 510, or a system that is external to the smart network 102. In step 520, the client device 130 generates and receives service communication data associated with executing the required service. The service communication data may be transmitted via the smart network host device 120 or directly between the client device 130 and service provider device.

Figure 6:
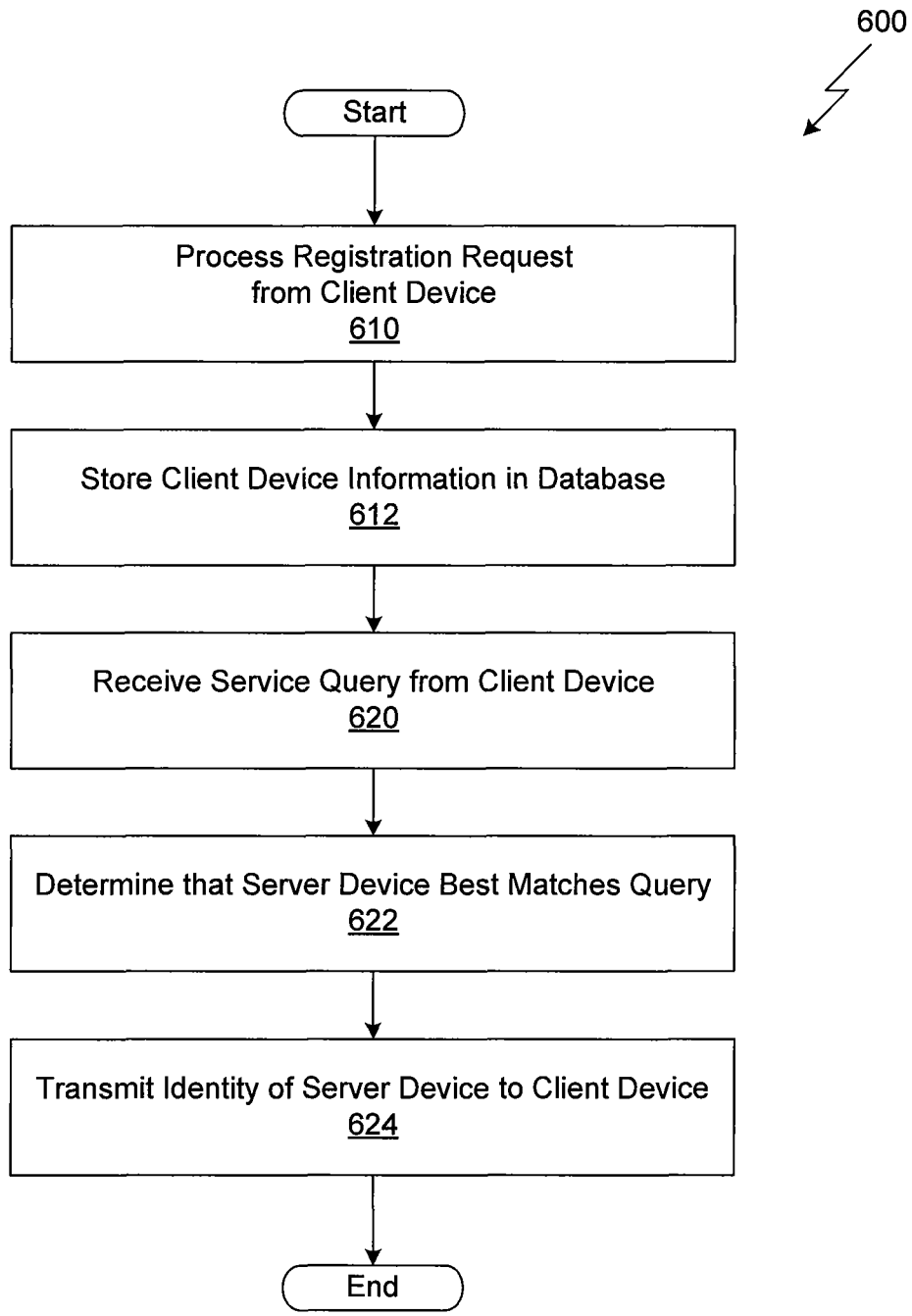
FIG. 6 is a flowchart of method steps for connecting a client device to a service within the smart network, according to one example embodiment of the present invention.

FIG. 6 is a flowchart of method steps 600 for connecting a client device to a service within the smart network 102, according to one example embodiment of the present invention. Although the method steps are described in conjunction with the systems of FIGS. 1A-1F, and 2-4, persons skilled in the art will understand that any other system configured to perform the method steps is within the scope of the present invention.

The method begins in step 610, were the smart network host device 120 processes a first registration request from a first client device 130. Registration includes assigning device data to the client device 130. The device data may include a unique IP address, a unique device name, and a name for each service name associated with the device. In step 612, the smart network host device 120 stores the device data within database 240. In one embodiment, the device data is stored within the database 240 prior to transmitting a response to the client device 130. In step 620, the smart network host device 120 receives a service query from the client device 130. The service query indicates a named service to which the client device 130 needs to connect. In step 622, the smart network host device 120 determines that a specific server device best matches the service query. In one embodiment, the smart network host device 120 determines that a specific server device best matches the service query based on certain criteria, such as topology data 354 and device status 350. For example, a particular server device may be selected from a set of server devices that each offer the named service needed by the client device 130, based on minimizing network hop count between the particular server and the client device 130. Furthermore, device status 350 for a particular server device may be used to avoid selecting server devices that are not currently available. In another embodiment, the smart network host device 120 determines that a specific server device best matches the service query based server load for each potential server device from a set of server devices that each offer the named service needed by the client device 130. Persons skilled in the art will recognize that any technically feasible technique may be implemented to determine server load without departing the scope and spirit of the present invention. In yet another embodiment, the smart network host device 120 determines that a specific server device best matches the service query based link speed and available bandwidth between the client device 130 and each server device from a set of server devices that each offer the named service needed by the client device. Persons skilled in the art will recognize that other technically feasible techniques may be also used to determine a best match without departing from the scope and spirit of the present invention. In step 624, the smart network host device 120 transmits the identity of the server device to the client device 130. The server device may be any client device, the smart network host device 120, or a server system external to the smart network 102.

In sum, example embodiments of the invention provide systems and methods for associating client devices within the smart network with named services. Each client device may offer or require a given named service. The smart network host device acts as a central authority to maintain device and service namespaces, and network state information needed to associate a client device to a particular service. A client device may query the central authority to determine what client devices and services are available to provide additional functionality or resources to the client device. The central authority is configured to store associations between specific client devices and their L2, L3, and L7 identifying information. The central authority uses L2-L7 attributes in determining which device should best serve a specific client device.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the invention may be devised without departing from the basic scope thereof. Therefore, the scope of the present invention is determined by the claims that follow.

We claim:

1. A method, comprising:
   processing a registration request from a client device to be registered with a central authority associated with a wireless home network, wherein the client device is assigned a device name, is identified by a transport address and an internet protocol (IP) address, and implements one or more services, each service being assigned a service name;
   storing within a database a client device record corresponding to the client device that includes the client device name, the transport address, the IP address, and the service name assigned to each of the one or more services implemented by the client device;
   receiving a service query from the client device requesting an identity of a server machine for a first service required by the client device;
   determining that a first server machine included in a set of possible server machines best matches the service query based on the transport address and the IP address of the client device and at least an IP address associated with the first server machine as well as services previously associated with the first sever machine within the database;
   transmitting a response message to the client device identifying the first server machine.

2. The method of claim 1, wherein the central authority is identified in the response message as being a first server for the service required by the client device, and the central authority acts as a proxy between the client device and the first server machine.

3. The method of claim 2, wherein the central authority performs data format translation between the first server machine and the client device.

4. The method of claim 1, wherein the database is configured to store topology data associated with the wireless home network that describes the connectivity of different devices within the wireless home network based on transport address information and device status information.

5. The method of claim 4, wherein determining that the first server machine best matches the service query is based on the topology data and device status information associated with each server machine included in the set of possible server machines.

6. The method of claim 4, wherein determining that the first server machine best matches the service query is based on information residing within the database that indicates a current load for each server machine included in the set of possible server machines.

7. The method of claim 4, wherein determining that the first server machine best matches the service query is based on link information within the database that indicates an available bandwidth for each possible route between the client device and each server machine included in the set of possible server machines.

8. The method of claim 1, wherein the transport address associated with the client device comprises an Ethernet media access control address.

9. The method of claim 1, wherein the response message comprises a domain name service reply message.

10. A computer-readable medium including instructions that, when executed by a processing unit, cause the processing unit to perform the steps of:
    processing a registration request from a client device to be registered with a central authority associated with a wireless home network, wherein the client device is assigned a device name, is identified by a transport address and an internet protocol (IP) address, and implements one or more services, each service being assigned a service name;
    storing within a database a client device record corresponding to the client device that includes the client device name, the transport address, the IP address, and the service name assigned to each of the one or more services implemented by the client device;
    receiving a service query from the client device requesting an identity of a server machine for a first service required by the client device;
    determining that a first server machine included in a set of possible server machines best matches the service query based on the transport address and the IP address of the client device and at least an IP address associated with the first server machine as well as services previously associated with the first sever machine within the database;
    transmitting a response message to the client device identifying the first server machine.

11. The computer-readable medium of claim 10, wherein the central authority is identified in the response message as being a first server for the service required by the client device, and the central authority acts as a proxy between the client device and the first server machine.

12. The computer-readable medium of claim 11, wherein the central authority performs data format translation between the first server machine and the client device.

13. The computer-readable medium of claim 10, wherein the database is configured to store topology data associated with the wireless home network that describes the connectivity of different devices within the wireless home network based on transport address information and device status information.

14. The computer-readable medium of claim 13, wherein determining that the first server machine best matches the service query is based on the topology data and device status information associated with each server machine included in the set of possible server machines.

15. The computer-readable medium of claim 13, wherein determining that the first server machine best matches the service query is based on information residing within the database that indicates a current load for each server machine included in the set of possible server machines.

16. The computer-readable medium of claim 13, wherein determining that the first server machine best matches the service query is based on link information within the database that indicates an available bandwidth for each possible route between the client device and each server machine included in the set of possible server machines.

17. The computer-readable medium of claim 10, wherein the transport address associated with the client device comprises an Ethernet media access control address.

18. The computer-readable medium of claim 10, wherein the response message comprises a domain name service reply message.

19. A system, comprising:

a processor complex configured to:

process a registration request from a client device to be registered with a central authority associated with a wireless home network, wherein the client device is assigned a device name, is identified by a transport address and an internet protocol (IP) address, and implements one or more services, each service being assigned a service name;

store within a database a client device record corresponding to the client device that includes the client device name, the transport address, the IP address, and the service name assigned to each of the one or more services implemented by the client device;

receive a service query from the client device requesting an identity of a server machine for a first service required by the client device;

determine that a first server machine included in a set of possible server machines best matches the service query based on the transport address and the IP address of the client device and at least an IP address associated with the first server machine as well as services previously associated with the first sever machine within the database;

transmit a response message to the client device identifying the first server machine.

20. The system of claim 19, wherein the database is configured to store topology data associated with the wireless home network that describes the connectivity of different devices within the wireless home network based on transport address information and device status information, and wherein determining that the first server machine best matches the service query is based on the topology data and device status information associated with each server machine included in the set of possible server machines.

* * * * *